Aug. 15, 1944.   J. A. HAASE   2,355,646
HAY BALER
Filed April 15, 1942   2 Sheets-Sheet 1
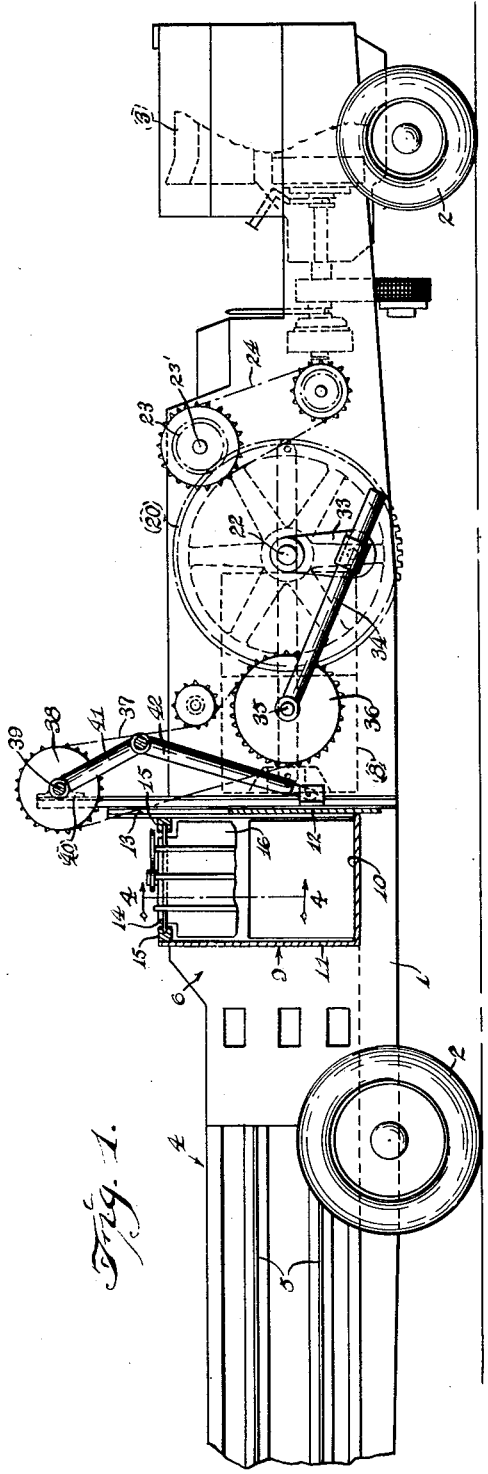
INVENTOR.
JESSE A. HAASE
BY: Wood & Hahn
ATTORNEYS.

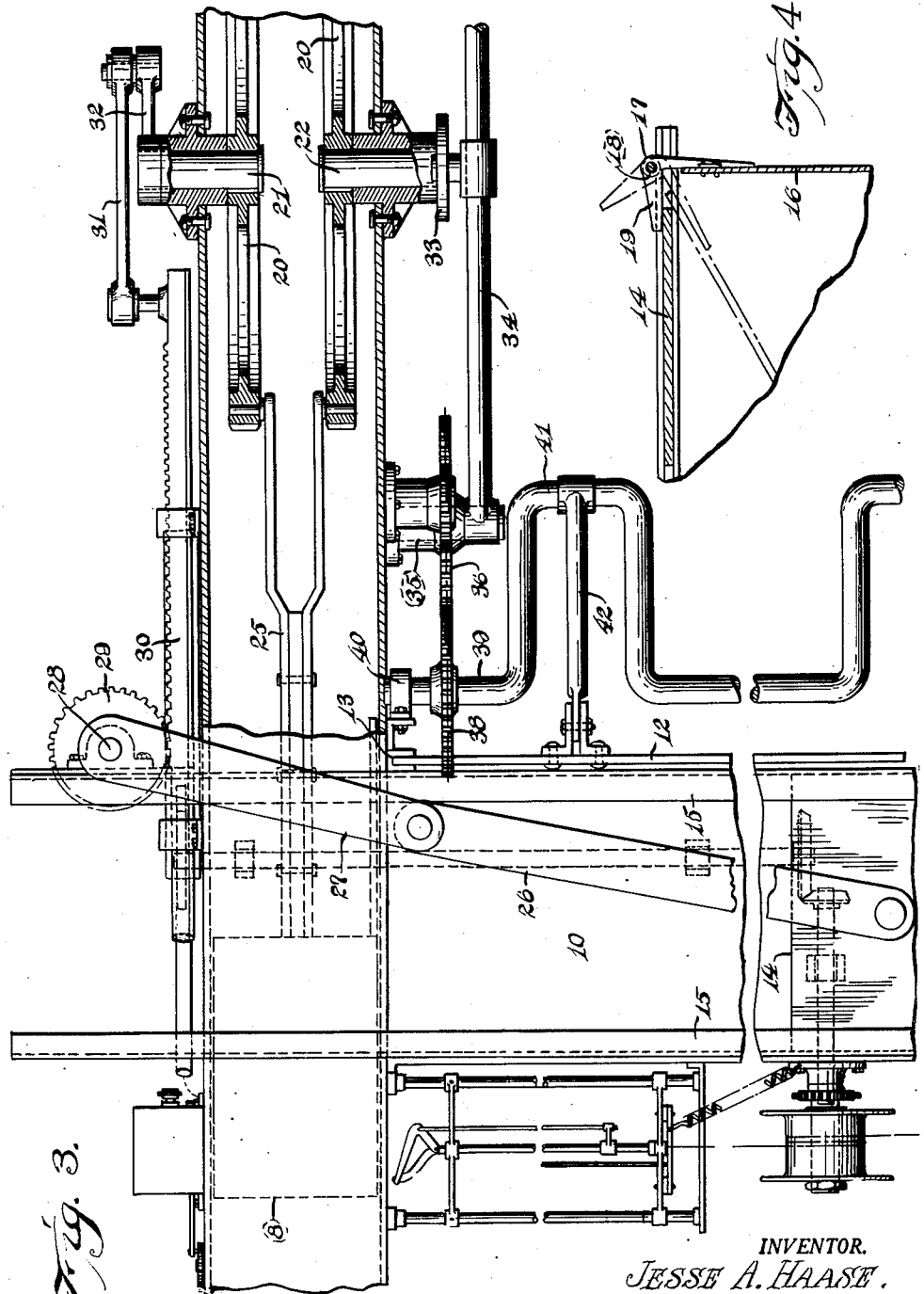

Patented Aug. 15, 1944

2,355,646

UNITED STATES PATENT OFFICE 2,355,646

HAY BALER

Jesse A. Haase, Martinsville, Ind.

Application April 15, 1942, Serial No. 439,073

6 Claims. (Cl. 100—25)

The present invention relates to baling machines primarily adapted for baling hay, straw, and the like.

One difficulty which has heretofore been experienced in the operation of the present type of commercial baling machine is the limitation to the speed of operation of the same. This is primarily due to the fact that in such machines, the material fed into the baling chamber is torn loose from the supply by the operation of the reciprocating plunger leaving ragged ends and unconfined ends of material projecting from each end of the bale. As a result, it has been necessary to provide what is known as tie boards which are dropped in front of and behind the bale to hold the bale in a more or less compacted position while the bale is tied with the usual baling wire. Due to the fact that these tie boards must be dropped into position and due to other deficiencies in the type of baling machine now used, the feed of the machine must be stopped to permit the insertion of a tie board. As a result, the entire operation of the machine is essentially slowed up.

Furthermore, in machines of the present commercial type, the hay fed into the machines is more or less continuously fed in, so that the completed bale becomes a compacted mass of more or less continuous material, making it difficult to separate portions of the bale for feeding or other purpose.

My present invention has for one of its objects the provision of a baling machine which will deliver to the baling chamber a series of pre-compressed severed masses of the material so that the completed bale will be formed of a series of segmental portions of material readily separable from the balance.

Furthermore, due to the fact that the material is completely severed from the supply of material prior to its compression in the baler, when the bale is complete, there are no ragged or torn ends projecting and I am enabled to dispense with the use of tie boards at each end of the bale to assist in the tying up of the bale with baling wire.

As a result of this arrangement, I am enabled to automatically complete the tying of the bale without stopping the machine and without the use of hand labor.

For the purpose of disclosing my invention, I have illustrated an embodiment thereof in the accompanying drawings, in which Fig. 1 is a side elevation of a baling machine embodying my invention and showing the pre-compression chamber in section;

Fig. 2 is a side elevation, looking at the opposite side of the machine from that shown in Fig. 1;

Fig. 3 is a partial plan of a baler embodying my invention; and

Fig. 4 is a detail fragmental section of the pre-compression plunger, taken substantially on the line 4—4 of Fig. 1 and looking in the direction of the arrows.

In the embodiment of the invention illustrated, there is provided the usual chassis frame 1 mounted on transportation wheels 2 and provided with an engine 3, for the purpose of driving the baling mechanism of the apparatus.

This engine 3 is adapted to be connected by suitable clutching means with the driving mechanism for driving the baler.

Mounted on the chassis 1 is a substantially rectangular box-like baling compartment 4 tapering toward its delivery end and preferably formed of a plurality of channel or I-beams such as 5. The baling compartment thus formed is of the usual construction of the commercial machines of this type and is adapted to receive the material to be baled at its intake end 6 and deliver the completely baled material from its delivery end 7. Due to the fact that the baling compartment tapers toward its delivery end, there is sufficient resistance offered on the passage of material therethrough to permit the baling plunger 8, adapted to operate in the compartment, to compress the material which is fed in front of the plunger and moved forwardly by the reciprocating movement of the plunger.

Extending laterally from the frame and at the rear end of the baling chamber or compartment 4 is a pre-compressor chamber 9 having a bottom 10 and side wall 11. The pre-compressor chamber is open on one side to receive the material to be baled. Vertically reciprocating across the open side is a shearing knife 12 which not only acts as a shearing knife for cutting the material but also acts as a side wall to close the pre-compressor chamber during a portion of the operation of the baler. This knife 12 operates in guide tracks 13 extending vertically at each end thereof for guiding the knife and holding the same against displacement. The top of the pre-compressor chamber is provided with a sliding cover 14 operating in guide tracks 15 and the far end of the cover is provided with a pusher 16. This pusher 16 is hung on a carrier shaft 17 mounted in eyes 18 on the end of the cover 14. Forwardly extending fingers 19 on the pusher overlie the cover, preventing swinging movement in one direction (as the pusher is projected) and permitting swinging in the opposite direction (as the pusher is retracted).

In the operation of so much of the baler as has been described, the material to be baled is fed into the pre-compressor 9 beneath the raised knife 12. This material may be fed into the pre-compressor by any suitable gatherer (not shown) adapted to pick the same up from the ground in event it is hay or straw, and feed the same into the pre-compressor chamber. On the downward reciprocation of the knife 12, the material is severed so that all of the material in the pre-compressor chamber is completely severed from the infeeding material. While the knife is in its downward position, the material which has been delivered into the pre-compressor chamber is moved from the pre-compressor chamber into the baling chamber, by the forward movement of the pusher 16, being somewhat confined as it is delivered into the baling chamber. At this time the baling plunger 8 is retracted so that the material is fed in front of the baling plunger in a more or less compact bundle. Completion of the forward movement of the pusher 16 brings that pusher into closing relation with the receiving opening of the baling chamber; and that relation is preferably maintained until, on its compressing stroke, the plunger 8 has moved past that opening. The forward movement of the plunger 8 therefore picks up this more or less compact bundle of material and forces the same forward in the baling chamber. With the feeding of a charge into the baling chamber, the knife 12 is raised to permit another charge from the gathering device to be fed into the chamber 9 and, on its retracted stroke, the plunger 16 will clear this charge, due to its swinging mounting. Repeated charges of pre-compressed material are thus successively fed into the baling chamber from the pre-compressor chamber and in front of the baling plunger, on each reciprocation of the plunger, until a complete bale is formed in the baling chamber.

The driving mechanisms of the parts are so timed that with the knife in its downward position, the pusher 16 is moved forward and with the pusher 16 moving forward, the baling plunger 8 is in its retracted position. After the baling plunger 8 has started to move forward, the pusher 16 is moved into its retracted position, swinging over the top of any hay or material which may have been fed into the pre-compressor chamber until it reaches a position to the rear of this material. By the time it has reached this position, the knife which had been raised again descends, thus severing the charge in the pre-compressor chamber ready for it to be advanced into the baling chamber.

For driving the baling plunger 8, I provide a pair of gears 20 mounted on stub shafts 21 and 22 carried in the frame of the structure. Each of these gears is adapted to mesh with a driving pinion 23 mounted on a shaft 23' and driven from the engine 3 through a suitable driving chain indicated at 24. The plunger 8 is connected to the gears 20 by a suitable pitman 25 through which the plunger 8 is reciprocated by the revolution of the gears 20.

The pusher 16 is reciprocated through the means of a link 26 pivotally connected to the sliding cover 14 and suitably connected to an oscillating arm 27. This arm is connected to an oscillating shaft 28 which, in turn, is driven by a pinion 29 meshing with a rack 30. The rack is reciprocated by a link 31 which, in turn, is driven from a crank 32 mounted on the shaft 21. Therefore, as the shaft 21, carrying the crank 32, is rotated, the rack 30 will be reciprocated, thereby oscillating the pinion 29 and, in turn, oscillating the arm 27 thus reciprocating the pusher 16 in timed relation to the movement of the plunger 8.

For reciprocating the knife, the shaft 22 carries a crank 33 having slidably connected therewith a lever arm 34. One end of the arm is rotatably fixed to a shaft 35 having fixed thereon a sprocket wheel 36. This sprocket wheel, in turn, is connected by a chain, indicated at 37, with a second sprocket wheel 38 fixed on a crank shaft 39 mounted on the frame in suitable bearings 40. The crank 41 of the shaft 39 is connected by link 42 with the knife 12 so that as the crank shaft 39 oscillates, a reciprocating movement is imparted to the knife. This movement, of course, is so timed as to permit a considerable amount of material to be fed into the compressor chamber during its upward movement so that there will be an accumulation of material in the compressor chamber on the descending movement of the knife and this material, of course, will be ready for its forward movement in the compressor chamber upon the projection movement of the pusher 16.

Any suitable means may be provided for tying the bale after it is completed, and I have shown, somewhat diagrammatically, one such mechanism, though it forms no part of the invention claimed herein.

I claim as my invention:

1. In a baling machine, the combination with a baling chamber and a reciprocating plunger operating therein, of a precompression chamber extending substantially transversely of the baling chamber and delivering into the side of said baling chamber, said precompression chamber having an opening in a side wall thereof to receive material to be baled, a support extending transversely of said precompression chamber, means for reciprocating said support longitudinally of said precompression chamber adjacent the top of said precompression chamber, a paddle suspended from said support and swingable about said support from a position in which said paddle substantially coincides with the cross sectional dimensions of said precompression chamber to a position in which said paddle extends from said support toward said baling chamber and above the floor of said precompression chamber, whereby material in said precompression chamber will be entrained by said paddle upon movement of said support toward said baling chamber but will not be entrained by said paddle upon movement of said support in the opposite direction, and means for closing said side wall opening of said precompression chamber during movement of said support in said first named direction only.

2. In a baling machine, the combination with a baling chamber and a reciprocating plunger operating therein, of a precompression chamber extending substantially transversely to the baling chamber and delivering into the side of said baling chamber, said precompression chamber having an opening in the side wall thereof to receive the material, a second reciprocating plunger operating in said precompression chamber to force the material therefrom into the baling chamber in advance of the baling plunger, a gate for the receiving opening in the precompression chamber and means operating to position said gate in closing relation to said opening during the material-moving operation of the precompression plunger and to remove said gate from such relation as retraction of said precompression plunger begins.

3. In a baling machine, the combination with a baling chamber horizontally disposed and having a receiving opening in its vertical side and a reciprocating plunger operating therein, of a precompression chamber extending substantially transversely to the baling chamber having a substantially horizontal bottom and delivering into the side of said baling chamber through said first-mentioned opening, said precompression chamber having a receiving opening in one of its side walls, a knife-edged gate for severing the material in the precompression chamber from the material supply prior to its entry into the baling chamber and for closing said precompression chamber receiving opening at times, and means operative while said gate is in closed position to force the severed material from said precompression chamber into the baling chamber in advance of the baling plunger.

4. In a baling machine, the combination with a baling chamber and a reciprocating plunger operating therein, of a precompression chamber extending substantially transversely of the baling chamber and delivering into the side of said baling chamber, said precompression chamber having a receiving opening in the side wall thereof, a reciprocating knife-edged gate operating across the face of said opening for severing the material fed into said precompression chamber from the source of supply and for closing said precompression chamber receiving opening at times, and means operative while said gate is in closed position to feed the severed material from the precompression chamber into the baling chamber in advance of the baling plunger.

5. In a baling machine, the combination with a baling chamber and a reciprocating plunger operating therein and a precompression chamber extending substantially transversely of the baling chamber and delivering into the side of said baling chamber, said precompression chamber having a receiving opening in the side wall thereof, a vertically reciprocating knife-edged gate operating across the face of said opening to sever the material fed into the precompression chamber from the source of supply and close said precompression chamber receiving opening at times, and a second reciprocating plunger operating in said precompression chamber while said gate is in closed position to feed the severed material from the precompression chamber to the baling chamber in advance of the baling plunger.

6. In a baling machine, the combination with a baling chamber and a reciprocating plunger operating therein, of a precompression chamber extending substantially transversely of the baling chamber and delivering into the side of said baling chamber, said precompression chamber having an opening in the side wall thereof for receiving the material, a reciprocating knife for severing the material fed into said precompression chamber from the source of supply and adapted to close the receiving opening thereof for a predetermined period, and a second reciprocating plunger operating in said precompression chamber for forcing the material therefrom into the baling chamber in advance of the baling plunger, said second plunger being pivoted to swing upwardly on its retractile stroke to clear the material fed into the precompression chamber after the projected stroke of the second plunger.

JESSE A. HAASE.